United States Patent
Kim et al.

(10) Patent No.: US 11,796,802 B2
(45) Date of Patent: Oct. 24, 2023

(54) DEVICE TRACKING GAZE AND METHOD THEREFOR

(71) Applicant: Electronics and Telecommunications Research Institute, Daejeon (KR)

(72) Inventors: Hyun Cheol Kim, Daejeon (KR); Joon Soo Kim, Daejeon (KR); Gwang Soon Lee, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 172 days.

(21) Appl. No.: 17/307,730

(22) Filed: May 4, 2021

(65) Prior Publication Data
US 2021/0349532 A1    Nov. 11, 2021

(30) Foreign Application Priority Data
May 8, 2020   (KR) .................. 10-2020-0055129

(51) Int. Cl.
*G02B 27/00*    (2006.01)
*G06F 3/01*     (2006.01)
(Continued)

(52) U.S. Cl.
CPC ..... *G02B 27/0093* (2013.01); *G02B 27/0172* (2013.01); *G02B 27/0179* (2013.01);
(Continued)

(58) Field of Classification Search
CPC ............ G02B 27/0093; G02B 27/0172; G02B 27/0179; G02B 2027/0138;
(Continued)

(56) References Cited

U.S. PATENT DOCUMENTS 10,031,650 B1 *   7/2018   Bastide .................. G06F 3/013
10,061,383 B1 *   8/2018   Ludusan ............... G06F 1/1626
(Continued)

FOREIGN PATENT DOCUMENTS

| KR | 101526557 B1   | 6/2015 |
| KR | 1020180015524 A | 2/2018 |
| KR | 101914190 B1   | 11/2018 |

OTHER PUBLICATIONS

Eui et al. "A Robust Eye Gaze Tracking Method based on a Virtual Eyeball Model" Machine Vision and Applications, vol. 20, Issue 5, pp. 319-337, Jul. 2009 (Year: 2009).*
(Continued)

*Primary Examiner* — Dmitriy Bolotin
(74) *Attorney, Agent, or Firm* — William Park & Associates Ltd.

(57) ABSTRACT

Disclosed herein a device tracking gaze and method therefor. The device includes: an image acquisition unit configured to obtain an eyeball image; a pupil detection unit configured to detect a center of pupil by using the eyeball image; a virtual corneal reflection light position generator configured to process the eyeball image so that a virtual corneal reflection light is located at a predetermined point in the eyeball image; and a PCVR vector generator configured to generate a pupil center virtual reflection vector (PCVR vector) based on a position of the pupil center and a position of the virtual corneal reflection light.

20 Claims, 7 Drawing Sheets

(51) Int. Cl.
*G06T 7/73* (2017.01)
*G06T 7/246* (2017.01)
*G02B 27/01* (2006.01)
*H04N 23/56* (2023.01)
*G06V 10/94* (2022.01)
*G06V 40/18* (2022.01)

(52) U.S. Cl.
CPC .............. *G06F 3/013* (2013.01); *G06T 7/246* (2017.01); *G06T 7/73* (2017.01); *G06V 10/94* (2022.01); *G06V 40/193* (2022.01); *H04N 23/56* (2023.01); *G02B 2027/0138* (2013.01); *G02B 2027/0187* (2013.01); *G06T 2207/30201* (2013.01); *G06T 2207/30204* (2013.01)

(58) Field of Classification Search
CPC . G02B 2027/0187; G06F 3/013; G06T 7/246; G06T 7/73; G06T 2207/30201; G06T 2207/30204; G06V 10/94; G06V 40/193; G06V 40/18; H04N 23/56
See application file for complete search history.

(56) References Cited

U.S. PATENT DOCUMENTS

| | | | |
|---|---|---|---|
| 2010/0069737 A1* | 3/2010 | Jinde | A61B 8/10 600/399 |
| 2010/0220288 A1* | 9/2010 | Cleveland | G06F 3/013 351/206 |
| 2012/0133754 A1 | 5/2012 | Lee et al. | |
| 2012/0272179 A1* | 10/2012 | Stafford | G06F 3/0482 345/157 |
| 2012/0295708 A1* | 11/2012 | Hernandez-Abrego | A63F 13/213 463/36 |
| 2014/0098198 A1* | 4/2014 | Lee | G06F 3/013 348/48 |
| 2014/0148728 A1* | 5/2014 | Eizenman | A61B 5/165 600/558 |
| 2014/0313308 A1* | 10/2014 | Wang | G06V 10/145 348/78 |
| 2015/0015478 A1* | 1/2015 | Hoffman | G06F 3/013 345/156 |
| 2015/0241755 A1* | 8/2015 | Cleveland | G06V 40/18 362/16 |
| 2016/0004303 A1* | 1/2016 | Arar | G06F 3/013 345/156 |
| 2018/0129282 A1* | 5/2018 | Sinay | H04N 23/667 |
| 2020/0305712 A1* | 10/2020 | Kojima | A61B 3/158 |

OTHER PUBLICATIONS

Yong-Goo Shin et al., A Novel Single IR Light based Gaze Estimation Method using Virtual Glints, IEEE Transactions on Consumer Electronics, vol. 61, No. 2, May 2015, pp. 254-260.

* cited by examiner

DEVICE TRACKING GAZE AND METHOD THEREFOR

CROSS REFERENCE TO RELATED APPLICATION

The present application claims priority to a Korean application 10-2020-0055129, filed May 8, 2020, the entire contents of which are incorporated herein for all purposes by this reference.

BACKGROUND OF THE INVENTION

Field of the Invention

The present disclosure relates to a gaze tracking device and method, and more particularly to a gaze tracking device using not an actual corneal reflection light but a virtual corneal reflection light and a method using the same.

Description of the Related Art

Figure 1:
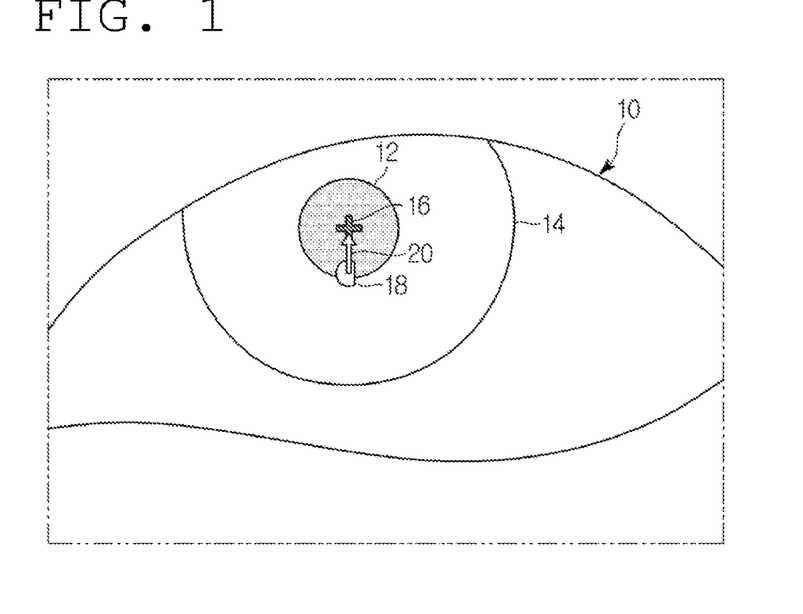
FIG. 1 is a view illustrating gaze tracking by means of an actual corneal reflection light in an existing gaze tracking device.

A wearable gaze tracker is a gaze tracking device that improves user convenience by being attached to the body like smart glasses with an embedded display device or a head mounted display (HMD). A gaze tracker may obtain a user's image by using light with a predetermined wavelength and a camera and track a gaze by analyzing the obtained image. As shown in FIG. 1, a corneal reflection light 18 is generated when light is reflected from the cornea of an eyeball 10, and a gaze may be tracked by using a vector 20 that is created by a center of the corneal reflection light 18 and a center 16 of a pupil 12 (pupil center corneal reflection vector 20. Hereinafter referred to as 'PCCRvector'). FIG. 1 is a view illustrating gaze tracking by means of an actual corneal reflection light in an existing gaze tracking device.

Herein, as each user has a different ocular structure, a calibration step may be performed before gaze tracking. In a calibration step, markers for inducing a user's gaze are sequentially displayed on a display device, and a mapping function may be generated by detecting the PCCR vector 20 from an image that is taken while the user gazes at the displayed markers.

Next, in a gaze tracking step, after detecting the PCCR vector 20 that is taken while the user gazes at a specific object on the display device, the user's gaze is tracked by mapping the gaze to a point on the display device through the mapping function that is generated during calibration.

Figure 2:
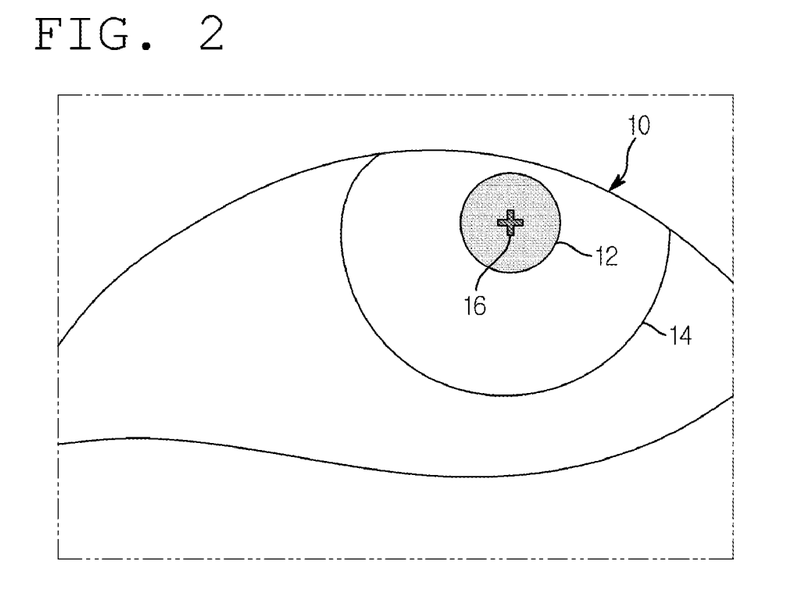
FIG. 2 is a view showing that an actual corneal reflection light disappears in an existing gaze tracking device and the gaze tracking in is impossible.

As shown in this step, the corneal reflection light 18 is an important element in gaze tracking. However, as a wearable gaze tracker installs a camera and light near the eyeball 10, the corneal reflection light 18 disappears depending on a motion of the eyeball 10, which is problematic. Specifically, as shown in FIG. 2, a phenomenon is caused in which a corneal reflection light (refer to 18 of FIG. 1) disappears. FIG. 2 is a view showing that an actual corneal reflection light disappears in an existing gaze tracking device and the gaze tracking in is impossible. A corneal reflection light exists in FIG. 1 but no corneal reflection light exists in FIG. 2 because of eyeball rotation. Accordingly, in the case of FIG. 2, as a PCCR vector (refer to 20 of FIG. 1) cannot be calculated, gaze tracking is impossible.

SUMMARY OF THE INVENTION

The present disclosure is directed to provide a gaze tracking device and method therefor, which may track a gaze by generating a pupil center virtual reflection (PCVR) vector through a virtual corneal reflection light, even when a corneal reflection light is not detected.

The technical objects of the present disclosure are not limited to the above-mentioned technical objects, and other technical objects that are not mentioned will be clearly understood by those skilled in the art through the following descriptions.

According to the present disclosure, there is provided a gaze tracking device, the device comprising: an image acquisition unit configured to obtain an eyeball image; a pupil detection unit configured to detect a center of pupil by using the eyeball image; a virtual corneal reflection light position generator configured to process the eyeball image so that a virtual corneal reflection light is located at a predetermined point in the eyeball image; and a PCVR vector generator configured to generate a pupil center virtual reflection vector (PCVR vector) based on a position of the pupil center and a position of the virtual corneal reflection light.

According to the embodiment of the present disclosure in the device, the position of the virtual corneal reflection light may be maintained to be consistent with a predetermined region.

According to the embodiment of the present disclosure in the device, the PCVR vector generator may generate the PCVR vector by excluding a position of an actual corneal reflection light that is reflected and detected on cornea due to light irradiation in the eyeball image.

According to the embodiment of the present disclosure in the device, the device may further comprise a calibration unit configured to provide a plurality of gaze induction markers sequentially to a display unit, to obtain PCVR vectors that are generated from the PCVR vector generator based on each position of pupil centers detected from the pupil detection unit at each gaze induction marker in the eyeball image and a position of the virtual corneal reflection light, and to calculate a mapping function for estimating a gazing point based on the PCVR vectors.

According to the embodiment of the present disclosure in the device, the device may further comprise a gazing point prediction unit configured to predict a gazing point on a display unit based on the PCVR vector and a mapping function for estimating the gazing point by obtaining the PCVR vector that is generated from the PCVR vector generator based on the position of the pupil center detected from the pupil detection unit in the eyeball image and the position of the virtual corneal reflection light. According to the embodiment of the present disclosure in the device, the virtual corneal reflection light, which is used when generating the PCVR vector and when predicting the gazing point, may be maintained at a same position in the eyeball image.

According to the embodiment of the present disclosure in the device, the device may further comprise comprising a light source for irradiating light to the eyeball, and the light source may be set by at least one of a position, an illuminance, and an irradiation angle so that no actual corneal reflection light, which is reflected from cornea and is detected, occurs in the eyeball image.

According to the embodiment of the present disclosure in the device, the light source maybe set by at least one of the position, the illuminance and the irradiation angle of the light source so that no glasses reflection occurs in the eyeball image when a user wears glasses.

According to the embodiment of the present disclosure in the device, the image acquisition unit may be configured either to directly capture the eyeball in a capturing direction toward the eyeball or to indirectly capture the eyeball that is reflected and emitted from a reflection unit installed toward the eyeball.

According to the embodiment of the present disclosure in the device, the gaze tracking device may be configured either as a block-out type gaze tracking device that visually blocks an actual environment out and enables only an image provided by a display unit to be viewed, or as a see-through type gaze tracking device that enables both an actual environment and the image to be viewed.

According to another embodiment of the present disclosure, there is provided a gaze tracking method, the method comprising: obtaining an eyeball image; detecting a center of pupil by using the eyeball image; and generating a pupil center virtual reflection vector (PCVR vector) based on a position of the pupil center and a position of the virtual corneal reflection light that is processed to appear at a predetermined point in the eyeball image.

According to the embodiment of the present disclosure in the method, the position of the virtual corneal reflection light may be maintained to be consistent with a predetermined region.

According to the embodiment of the present disclosure in the method, the generating of the PCVR vector may generate the PCVR vector by excluding a position of an actual corneal reflection light that is reflected and detected on cornea due to light irradiation in the eyeball image.

According to the embodiment of the present disclosure in the method, the method may further comprise: processing the eyeball image so that the virtual corneal reflection light is located at a predetermined point in the eyeball image, before the generating of the PCVR vector; and providing a plurality of gaze induction markers sequentially to a display unit, obtaining PCVR vectors based on each position of pupil centers detected at each gaze induction marker in the eyeball image and a position of the virtual corneal reflection light, and to calculating a mapping function for estimating a gazing point based on the PCVR vectors, after the generating of the PCVR vector.

According to the embodiment of the present disclosure in the method, the method may further comprise predicting the gazing point on a display based on the PCVR vector and a mapping function for estimating the gazing point by obtaining the PCVR vector based on the position of the pupil center detected in the eyeball image and the position of the virtual corneal reflection light, after the generating of the PCVR vector.

According to the embodiment of the present disclosure in the method, the virtual corneal reflection light, from the generating of the PCVR vector to the predicting of the gazing point, maybe maintained at a same position in the eyeball image.

According to the embodiment of the present disclosure in the method, the obtaining the eyeball image may comprise obtaining the eyeball image by irradiating light to the eyeball by a light source, and the light source maybe set by at least one of a position, an illuminance, and an irradiation angle so that no actual corneal reflection light, which is reflected from cornea and is detected, occurs in the eyeball image.

According to the embodiment of the present disclosure in the method, the light source maybe set by at least one of the position, the illuminance and the irradiation angle of the light source so that no glasses reflection occurs in the eyeball image, when a user wears glasses.

According to the embodiment of the present disclosure in the method, the obtaining of the eyeball image may comprise either directly capturing the eyeball in a capturing direction toward the eyeball or indirectly capturing the eyeball that is reflected and emitted from a reflection unit installed toward the eyeball.

According to the embodiment of the present disclosure in the method, a gaze tracking apparatus configured to implement the gaze tracking method is a block-out type gaze tracking device, which visually blocks an actual environment out and enables only an image provided by a display unit to be viewed, or a see-through type gaze tracking device that enables both an actual environment and the image to be viewed.

The features briefly summarized above for this disclosure are only exemplary aspects of the detailed description of the disclosure which follow, and are not intended to limit the scope of the disclosure.

The technical problems solved by the present disclosure are not limited to the above technical problems and other technical problems which are not described herein will be clearly understood by a person (hereinafter referred to as an ordinary technician) having ordinary skill in the technical field, to which the present disclosure belongs, from the following description.

DETAILED DESCRIPTION

Hereinafter, exemplary embodiments of the present disclosure will be described in detail with reference to the accompanying drawings so that those skilled in the art may easily implement the present disclosure. However, the present disclosure may be implemented in various different ways, and is not limited to the embodiments described therein.

In describing exemplary embodiments of the present disclosure, well-known functions or constructions will not be described in detail since they may unnecessarily obscure the understanding of the present disclosure. The same constituent elements in the drawings are denoted by the same reference numerals, and a repeated description of the same elements will be omitted.

In the present disclosure, when an element is simply referred to as being "connected to", "coupled to" or "linked to" another element, this may mean that an element is "directly connected to", "directly coupled to" or "directly linked to" another element or is connected to, coupled to or linked to another element with the other element intervening therebetween. In addition, when an element "includes" or "has" another element, this means that one element may further include another element without excluding another component unless specifically stated otherwise.

In the present disclosure, the terms first, second, etc. are only used to distinguish one element from another and do not limit the order or the degree of importance between the elements unless specifically mentioned. Accordingly, a first element in an embodiment could be termed a second element in another embodiment, and, similarly, a second element in an embodiment could be termed a first element in another embodiment, without departing from the scope of the present disclosure.

In the present disclosure, elements that are distinguished from each other are for clearly describing each feature, and do not necessarily mean that the elements are separated. That is, a plurality of elements may be integrated in one hardware or software unit, or one element may be distributed and formed in a plurality of hardware or software units. Therefore, even if not mentioned otherwise, such integrated or distributed embodiments are included in the scope of the present disclosure.

In the present disclosure, elements described in various embodiments do not necessarily mean essential elements, and some of them may be optional elements. Therefore, an embodiment composed of a subset of elements described in an embodiment is also included in the scope of the present disclosure. In addition, embodiments including other elements in addition to the elements described in the various embodiments are also included in the scope of the present disclosure.

The advantages and features of the present disclosures and the way of attaining them will become apparent with reference to embodiments described below in detail in conjunction with the accompanying drawings. Embodiments, however, may be embodied in many different forms and should not be constructed as being limited to example embodiments set forth herein. Rather, these embodiments are provided so that this disclosure will be complete and will fully convey the scope of the invention to those skilled in the art.

Hereinafter, embodiments of the present disclosure will be described with reference to the accompanying drawings.

Referring to FIGS. 3 to 6, a gaze tracking device according to an embodiment of the present disclosures will be described.

Figure 3:
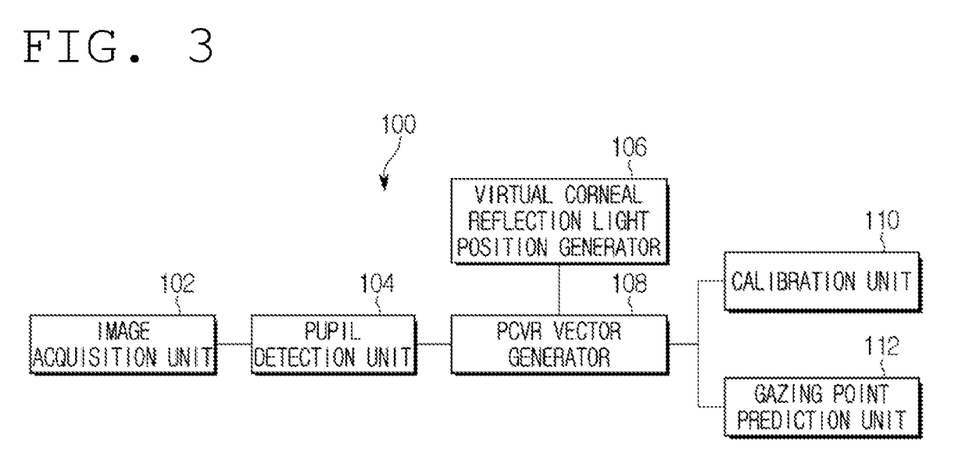
FIG. 3 is a block diagram showing a gaze tracking device according to an embodiment of the present disclosure.
Figure 4:
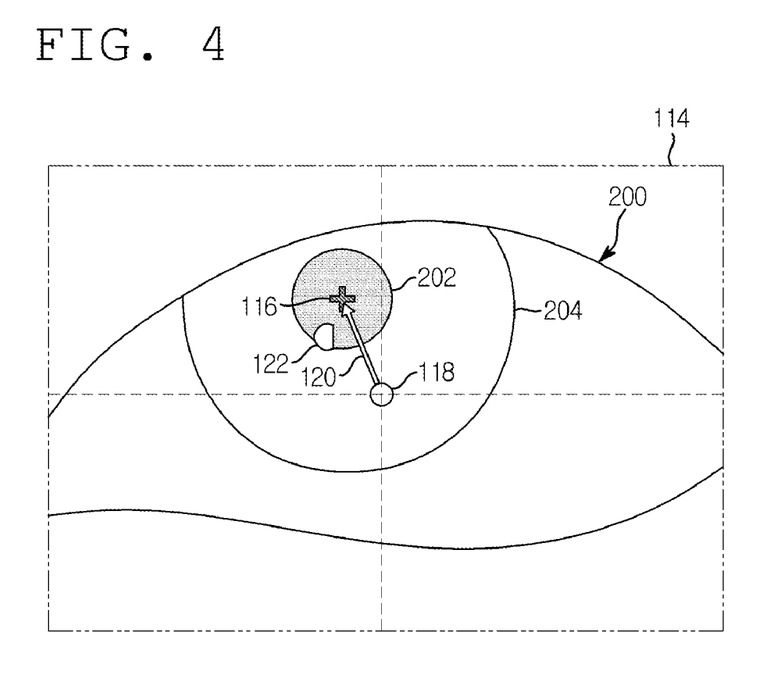
FIG. 4 is a view illustrating a case in which a PCVR vector is generated by locating a virtual corneal reflection light in an eyeball image in which an actual corneal reflection light is present.
Figure 5:
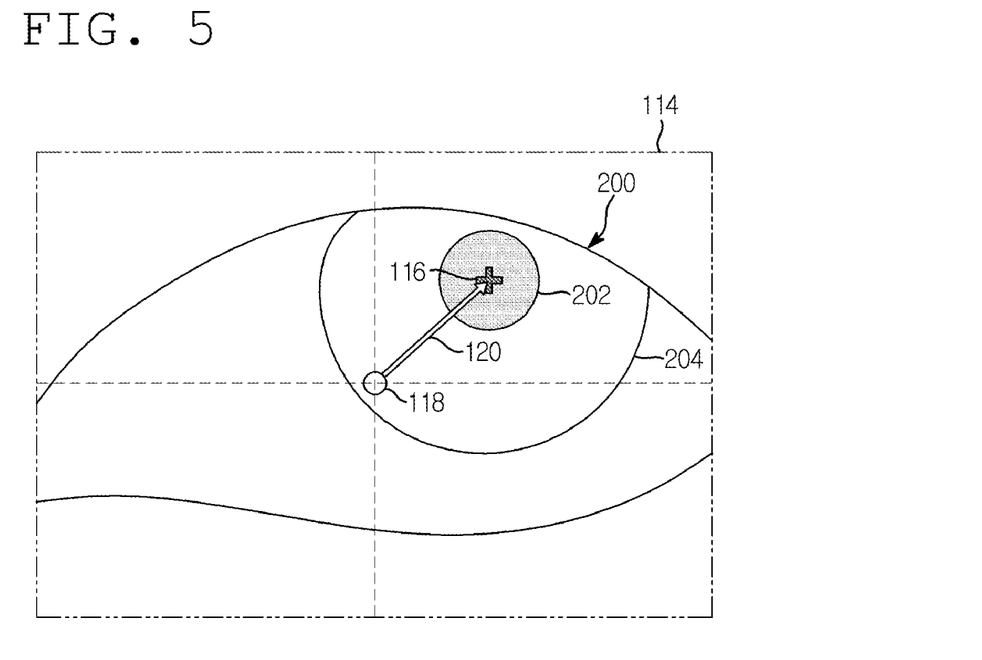
FIG. 5 is a view illustrating a case in which a PCVR vector is generated by locating a virtual corneal reflection light in an eyeball image in which no actual corneal reflection light is present.

FIG. 3 is a block diagram showing a gaze tracking device according to an embodiment of the present disclosure. FIG. 4 is a view illustrating a case in which a PCVR vector is generated by locating a virtual corneal reflection light in an eyeball image in which an actual corneal reflection light is present, and FIG. 5 is a view illustrating a case in which a PCVR vector is generated by locating a virtual corneal reflection light in an eyeball image in which no actual corneal reflection light is present.

A gaze tracking device 100 is a device that may calculate a pupil center virtual reflection vector (hereinafter, 'PCVR' vector) 120 between a virtual corneal reflection light 118 and a pupil center 116 captured in an eyeball image 114 by setting the virtual corneal reflection light 118 at a predetermined position of the eyeball image 114 and performs calibration and estimation of a gazing point using the PCVR vector 120. The gaze tracking device 100 may be a wearable device or a non-wearable device. When being a wearable device, the gaze tracking device 100 may be a block-out type gaze tracking device, which visually blocks an actual environment out and enables only an image provided by a display unit to be viewed, or a see-through type gaze tracking device which enables both an actual environment and an image to be viewed.

Specifically, the gaze tracking device 100 includes an image acquisition unit 102, a pupil detection unit 104, a virtual corneal reflection light position generator 106, and a PCVR vector generator 108.

Figure 6:
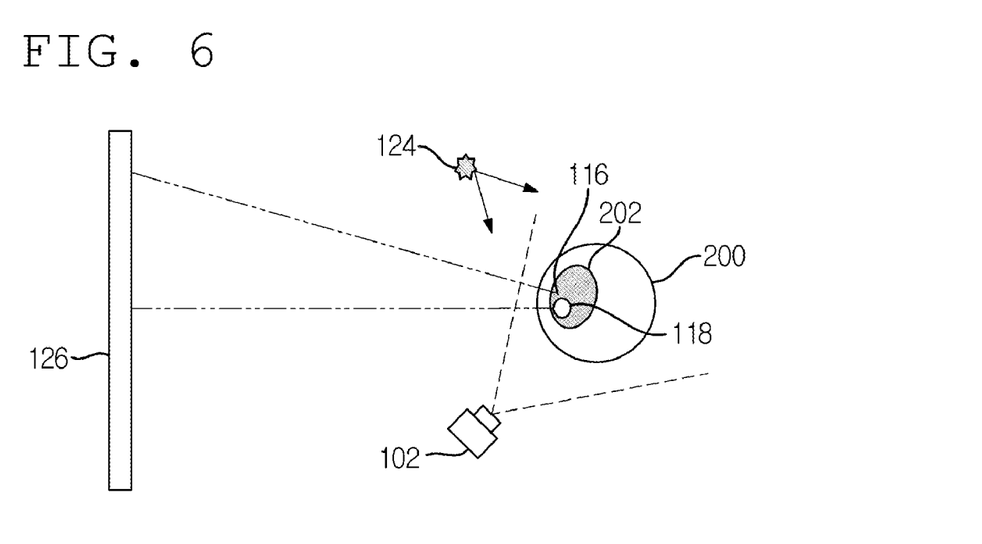
FIG. 6 is a view schematically showing an operation of a gazing point prediction unit in a gaze tracking device according to the embodiment of the present disclosure.

The image acquisition unit 102 is an imaging sensor like a camera and obtains an eyeball image 114 of a user using the gaze tracking device 100. As shown in FIG. 6, the image acquisition unit 102 may obtain the eyeball image 114 irradiated by light of a light source (refer to 124 of FIG. 6) having a predetermined wavelength. When the image acquisition unit 102 emits infrared radiation as light, it gains an area irradiated by infrared light to clearly recognize a boundary between a pupil 202 and an iris 204. The image acquisition unit 102 equipped with an infrared pass filter obtains the eyeball image 114 that is taken only by infrared radiation. The image acquisition unit 102 is configured to obtain the eyeball image 114 including a pupil with a size that is suitable for gaze tracking within a range not blocking a user's view. The image acquisition unit 102 may be installed under an eyeball as illustrated in FIG. 6. However, the image acquisition unit 102 may be installed at any position where the eyeball image 114 may be normally taken.

When the above-described light source 124 uses infrared light, the light source 124, for example, maybe configured as a light with an infrared wavelength like an infrared LED, a halogen lamp, a xenon lamp, and an incandescent lamp.

As shown in FIG. 4 and FIG. 5, the pupil detection unit 104 detects a center of a pupil 202 using the eyeball image 114. For example, the pupil detection unit 104 extracts a pupil center position in a region of interest (ROI) like an eyeball 200 and a face around the eyeball. For example, the pupil detection unit 104 corrects a brightness value of each pixel of a ROI by using an average brightness value of the ROI as a criterion and secures visibility of an image by performing histogram stretching. Next, in order to distinguish a pupil and a region not the pupil, the pupil detection unit 104 searches a maximally labeled region by tracking a contour point with a pixel value of 0 through binarization, morphology and labeling operation in an image to which histogram stretching is applied. The pupil detection unit 104 extracts a pupil boundary using a canny edge detector and a convex hull algorithm in a labeled region. Finally, the pupil detection unit 104 may detect a position of the pupil center 116 by an ellipse fitting method based on a coordinate value of an extracted pupil boundary. The above-described technique is only an example, and the pupil detection unit 104 may use various image processing techniques other than the technique as long as accurate detection is ensured.

As illustrated in FIG. 4 and FIG. 5, the virtual corneal reflection light position generator 106 processes the eyeball image 114 so that the virtual corneal reflection light 118 is located at a predetermined point in the eyeball image 114. The predetermined point may be preset in the device 100.

As illustrated in FIG. 4 and FIG. 5, a point of the virtual corneal reflection light 118 may be located in a central region of the eyeball image 114 in order to reduce a deviation of PCVR vector according to a position of a pupil center moving within a predetermined distance from a center point of the eyeball image 114. The virtual corneal reflection light 118 employs a specific pixel position of the eyeball image 114 as a corresponding point.

In this embodiment, the virtual corneal reflection light 118 is located in the central region of the eyeball image 114. However, if the virtual corneal reflection light 118 is capable of being constantly maintained in a predetermined region in a calibration and gazing point prediction process, it is also possible to locate the virtual corneal reflection light 118 at another pixel of the eyeball image 114 other than the central region. That is, exemplifying a pixel of the eyeball image 114 as a coordinate, even when the virtual corneal reflection light 118 is generated at any position like the pixel coordinate (0, 0) or (100, 100), a PCVR vector may be obtained. In addition, as gaze tracking is possible by maintaining a fixed position of the virtual corneal reflection light 118 in a calibration step and a gazing point prediction step, there is an advantage that a gaze is trackable in an environment where no actual corneal reflection light is present, for example, in a situation where the gaze tracking device 100 is a wearable device and a user wearing glasses uses the gaze tracking device 100 so that no actual corneal reflection light caused by the light source 124 does not exist.

As shown in FIG. 4 and FIG. 5, the PCVR vector generator 108 generates the PCVR vector 120 based on a position of the pupil center 116 and a position of the virtual corneal reflection light 118. As shown in FIG. 4, even when there is an actual corneal reflection light that is detected in the eyeball image 114 by being reflected from cornea by light irradiation, the PCVR vector generator 108 may exclude a position of the actual corneal reflection light 122 and generate the PCVR vector 120 based on a position of the virtual corneal reflection light 118. The actual corneal reflection light 122 may be observed in a form of a bright point in the eyeball image 114 that is obtained from the image acquisition unit 102 by infrared light of the light source 124.

The calibration unit 110 may provide a plurality of gaze induction markers sequentially to a display unit (refer to 126 of FIG. 6), obtain PCVR vectors 120 that are generated from the PCVR vector generator 108 based on each position of pupil centers 116 detected from the pupil detection unit 104 at each gaze induction marker in the eyeball image 114 and a position of the virtual corneal reflection light 118, and produce a mapping function for estimating a gazing point based on the PCVR vectors 120.

Specifically, calibration may mean an operation of mapping a user's gaze to one point of the display unit 126. The calibration unit 110 provides a plurality of gaze induction markers on the display unit 126, for example, at least 4 gaze induction markers sequentially to different points of the display unit 126 and induces a user to gaze the gaze induction markers that are sequentially marked. By controlling the pupil detection unit 104, the calibration unit 110 obtains each position of the pupil centers 116, which are detected from the pupil detection unit 104, at each gaze induction marker in the eyeball image 114. The calibration unit 110 obtains a position of the virtual corneal reflection light 118 that is processed from the virtual corneal reflection light position generator 106 to a predetermined point of the eyeball image 114. The calibration unit 110 obtains the PCVR vectors 120 by controlling the PCVR vector generator 108 so that the PCVR vector generator 108 generates the PCVR vectors 120 based on each position of the pupil centers 116 detected at each gaze induction marker and a position of the virtual corneal reflection light 118. Herein, as shown in FIG. 4, even when an actual corneal reflection light is detected in the eyeball image 114, the calibration unit 110 may exclude a position of the actual corneal reflection light 122 by the PCVR vector generator 108 and may obtain the PCVR vector 120 that is generated based on a position of the virtual corneal reflection light 118. The calibration unit 110 may produce a mapping function, for example, a mapping matrix based on the PCVR vectors 120. A mapping matrix may be configured to map a user's gazing position according to a PCVR vector and a gaze induction marker.

A gazing point prediction unit 112 may predict a gazing point on the display unit 126 based on a mapping function produced from the calibration unit 110 and the PCVR vector 120 by obtaining the PCVR vector 120 that is generated from the PCVR vector generator 108 based on a position of the pupil center 116 detected from the pupil detection unit 104 in the eyeball image 114 and a position of the virtual corneal reflection light 118.

FIG. 6 is a view schematically showing an operation of a gazing point prediction unit in a gaze tracking device according to the embodiment of the present disclosure.

Specifically, as shown in FIG. 6, the gazing point prediction unit 112 predicts a user's gazing point when the user wears the gaze tracking device 100, is viewing an image provided through the display unit 126 and gazes a specific point on a screen of the display unit 126.

By controlling the pupil detection unit 104, the gazing point prediction unit 112 obtains a position of the pupil center 116, which is detected from the pupil detection unit 104 in the eyeball image 114 of a user viewing an image. The gazing point prediction unit 112 obtains a position of the virtual corneal reflection light 118 that is processed from the virtual corneal reflection light position generator 106 to a predetermined point of the eyeball image 114. The gazing point prediction unit 112 obtains the PCVR vector 120 by controlling the PCVR vector generator 108 so that the PCVR vector generator 108 generates the PCVR vectors 120 based on a position of the pupil center 116 detected from the eyeball image 114 of a user viewing an image and a position of the virtual corneal reflection light 118. Like the calibration unit 110, even when an actual corneal reflection light is detected in the eyeball image 114, the gazing point prediction unit 112 may exclude a position of the actual corneal reflection light 122 by the PCVR vector generator 108 and may obtain the PCVR vector 120 that is generated based on a position of the virtual corneal reflection light 118. The gazing point prediction unit 112 may predict a user's gazing point on a screen based on the PCVR vector 120 and a mapping function.

As long as a distance between a user's eyeball and the display unit varies significantly in a calibration process and a gazing point prediction process or a viewing environment does not significantly change, when generating a vector of the PCVR vector generator 108 requested by the calibration unit 110 and the gazing point prediction unit 112, the virtual corneal reflection light position generator 106 maintains the virtual corneal reflection light 118 at a same position in the eyeball image 114. A position of the virtual corneal reflection light 118 is employed as a reference point of a mapping function and thus acts as an important factor for estimating a position of a gazing point. Although the actual corneal reflection light 122 may conventionally exist at an actually identical position in a calibration and gazing point prediction process, it may be detected at a different pixel position of the eyeball image 114 in some cases because of a slight difference. However, in the present embodiment, as the virtual corneal reflection light 118 as a reference point of a mapping function is firmly fixed at a specific pixel position of the eyeball image 114 throughout a calibration and gazing point prediction process, a gazing point may be accurately predicted through a mapping function in a calibration process.

Also, in the present embodiment, depending on a user's wearing status and all the conditions of light source, the user's gaze may be tracked even when the actual corneal reflection light 122 is not detected in the gaze tracking device 100.

Hereinafter, a gaze tracking method according to other embodiments of the present disclosures will be described with reference to FIGS. 3 to 8. A gaze tracking method may be implemented by the above-described gaze tracking device 100.

Figure 7:
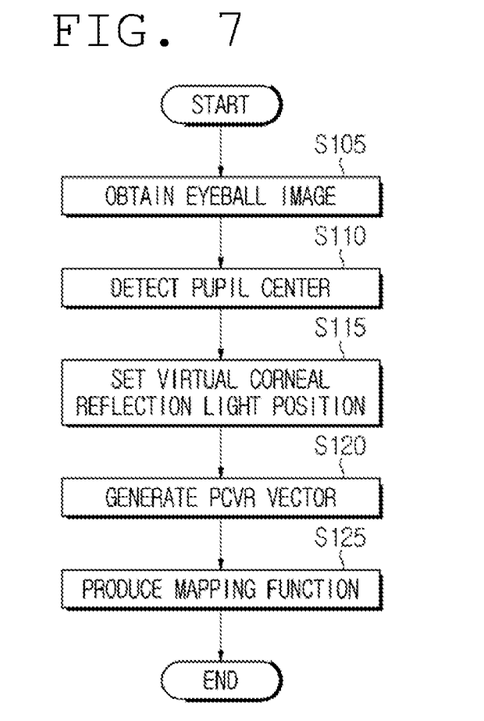
FIG. 7 is a flowchart concerning a gaze tracking method according to another embodiment of the present disclosure.
Figure 8:
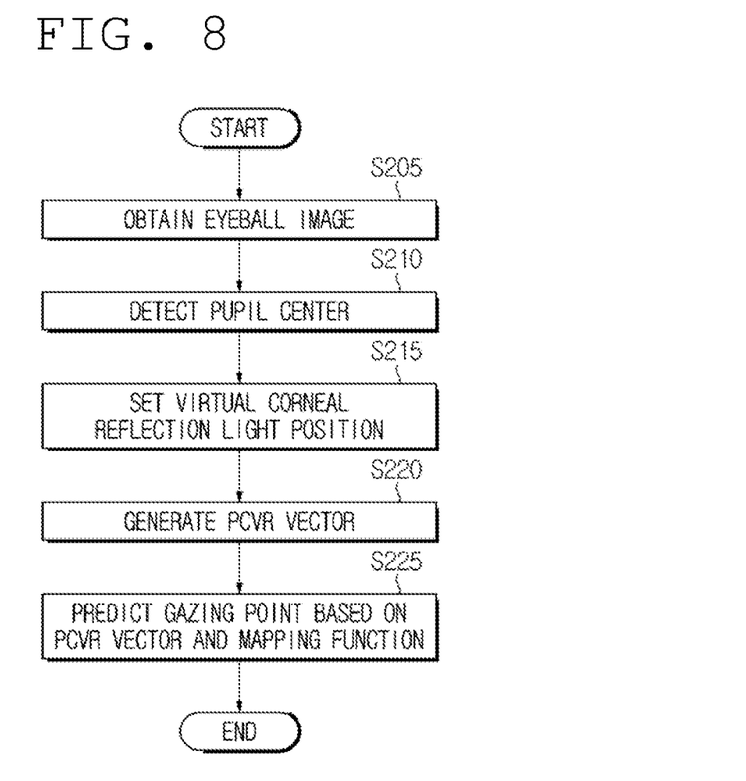
FIG. 8 is a flowchart concerning a gaze tracking method according to yet embodiment of the present disclosure.

FIG. 7 is a flowchart concerning a gaze tracking method according to another embodiment of the present disclosure. FIG. 8 is a flowchart concerning a gaze tracking method according to yet embodiment of the present disclosure and is related to a gazing point prediction process in the gaze tracking method.

Referring to FIG. 7, the calibration unit 110 obtains the eyeball image 114 as in FIG. 4 and FIG. 5 by controlling the image acquisition unit 102 (S105).

Next, by controlling the pupil detection unit 104, the calibration unit 110 detects each position of the pupil centers 116, which are obtained from the pupil detection unit 104, at each gaze induction marker in the eyeball image 114 (S110).

Specifically, the calibration unit 110 provides a plurality of gaze induction markers on the display unit 126, for example, at least 4 gaze induction markers sequentially to different points of the display unit 126 and induces a user to gaze the gaze induction markers that are sequentially marked. The calibration unit 110 receives positions of the pupil centers 116 at each gaze induction marker from the pupil detection unit 104.

Then, the calibration unit 110 obtains a position of the virtual corneal reflection light 118 that is set and processed from the virtual corneal reflection light position generator 106 to a predetermined point of the eyeball image 114 (S115).

As a position of the virtual corneal reflection light 118 is described above through the gaze tracking device 100, detailed description will be skipped.

Next, the calibration unit 110 obtains the PCVR vectors 120 by controlling the PCVR vector generator 108 so that the PCVR vector generator 108 generates the PCVR vectors 120 based on each position of the pupil centers 116 detected at each gaze induction marker and a position of the virtual corneal reflection light 118 (S120).

Then, the calibration unit 110 produces a mapping function, for example, a mapping matrix based on the PCVR vectors 120 (S125).

Referring to FIG. 8, the gazing point prediction unit 112 obtains the eyeball image 114 of a user viewing the image as in FIG. 4 and FIG. 5 by controlling the image acquisition unit 102 (S205).

Next, by controlling the pupil detection unit 104, the gazing point prediction unit 112 obtains a position of the pupil center 116 that is detected in the eyeball image 114 of a user (S210).

Then, the gazing point prediction unit 112 obtains a position of the virtual corneal reflection light 118 that is processed from the virtual corneal reflection light position generator 106 to a predetermined point of the eyeball image 114 (S215).

Then, the gazing point prediction unit 112 generates the PCVR vector 120 by controlling the PCVR vector generator 108 so that the PCVR vector generator 108 generates the PCVR vectors 120 based on a position of the pupil center 116 and a position of the virtual corneal reflection light 118 (S220).

Herein, when the PCVR vector generator 108 generates a vector at a request of the gazing point prediction unit 122, the virtual corneal reflection light position generator 106 maintains a virtual corneal reflection light at the same position as in the step S115 and the step S120 of calibration in the eyeball image 114, unless an unavoidable situation occurs.

Then, the gazing point prediction unit 112 predicts a user's gazing point on a screen of the display unit 126 based on the PCVR vector 120 and a mapping function (S225).

Figure 9:
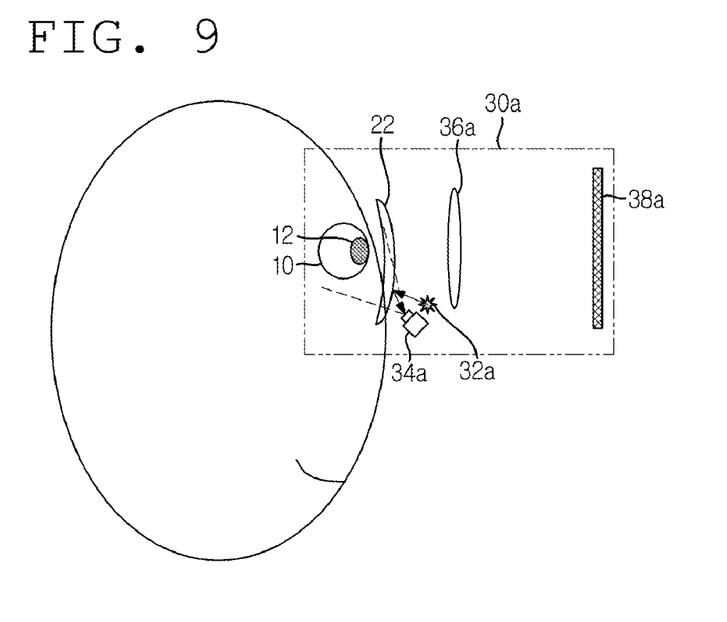
FIG. 9 and FIG. 10 are views illustrating a case in which a user wearing glasses uses an existing gaze tracking device.
Figure 10:
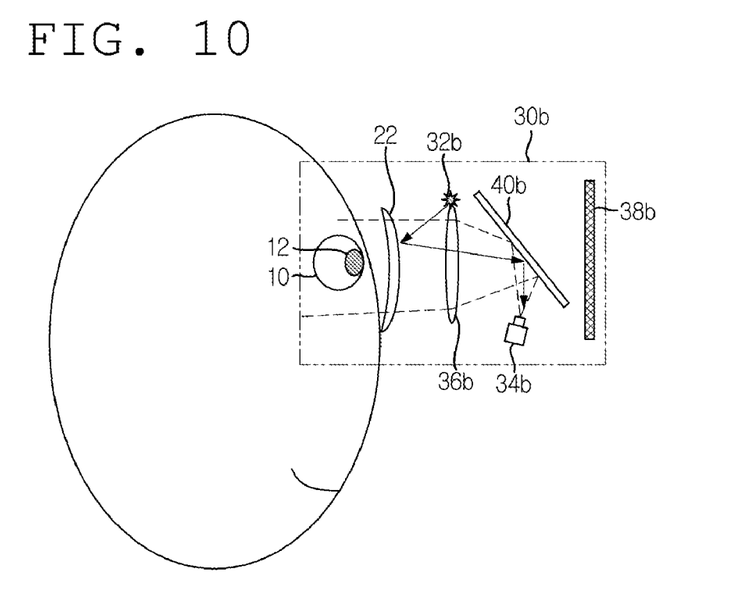

FIG. 9 and FIG. 10 are views illustrating a case in which a user wearing glasses uses an existing gaze tracking device. Conventional first and second gaze tracking devices 30A and 30B illustrated in FIG. 9 and FIG. 10 are wearable devices like a head mounted device (HMD) and are equipped with an actual corneal reflection light detector and a PCCR vector generator, instead of the virtual corneal reflection light position generator 106 and the PCVR vector generator 108 of FIG. 3. The conventional first and second gaze tracking devices 30A and 30B calculate a PCCR vector based on a center of pupil 12 and an actual corneal reflection light, which is reflected from cornea by light of the light sources 32A and 32B, and find a mapping function or predict a gazing point by using the PCCR vector.

The conventional first gaze tracking device 30A illustrated in FIG. 9 employs a method in which a camera 34A directly captures an eyeball 10 in a direction toward the eyeball 10.

When being used for a user wearing glasses, the conventional first gaze tracking device 30A includes a camera 34A, which is placed between the user's glasses 22 and a lens 36A and is located under the glasses 22, a light source 32A, and a display unit 38A. The conventional first gaze tracking device 30A includes an image acquisition unit, a pupil detection unit, a calibration unit, and a gazing point prediction unit among the components illustrated in FIG. 3 and, as a different configuration from FIG. 3, includes an actual corneal reflection light detector and a PCCR vector generator.

Gaze tracking is performed using an eyeball image taken by the camera 34A. However, when a user wears the glasses 22 in the conventional first gaze tracking device 30A, glasses reflection occurs due to the light source 32A as indicated by the arrows expressing the optical paths of the light source 32A. For this reason, the pupil 12 is obstructed or no actual corneal reflection light exists. Because of this problem, a PCCR vector is not calculated, and gaze tracking becomes impossible.

The conventional second gaze tracking device 30B illustrated in FIG. 10 employs a configuration method in which a camera 34B indirectly captures the eyeball 10 that is reflected and emitted from a reflection unit 40B installed toward the eyeball 10.

When being used for a user wearing glasses, the conventional second gaze tracking device 30B includes a camera 34B, which is placed between a lens 36B facing the user's glasses 22 and the reflection unit 40B, a light source 32B, which is placed between the glasses 22 and the reflection unit 40B and is located around the lens 36B, and a display unit 38B. Like the conventional first gaze tracking device 30A, the conventional second gaze tracking device 30B includes an image acquisition unit, a pupil detection unit, a calibration unit, a gazing point prediction unit, an actual corneal reflection light detector, and a PCCR vector generator.

Gaze tracking is performed using an eyeball image taken by the camera 34B. However, when a user also wears the glasses 22 in the conventional second gaze tracking device 30B, glasses reflection occurs due to the light source 32B as indicated by the arrows expressing the optical paths of the light source 32B. For this reason, like in the conventional gaze tracking device 30A, since the pupil 12 is obstructed or no actual corneal reflection light exists, a PCCR vector is not calculated, and gaze tracking becomes impossible.

Figure 11:
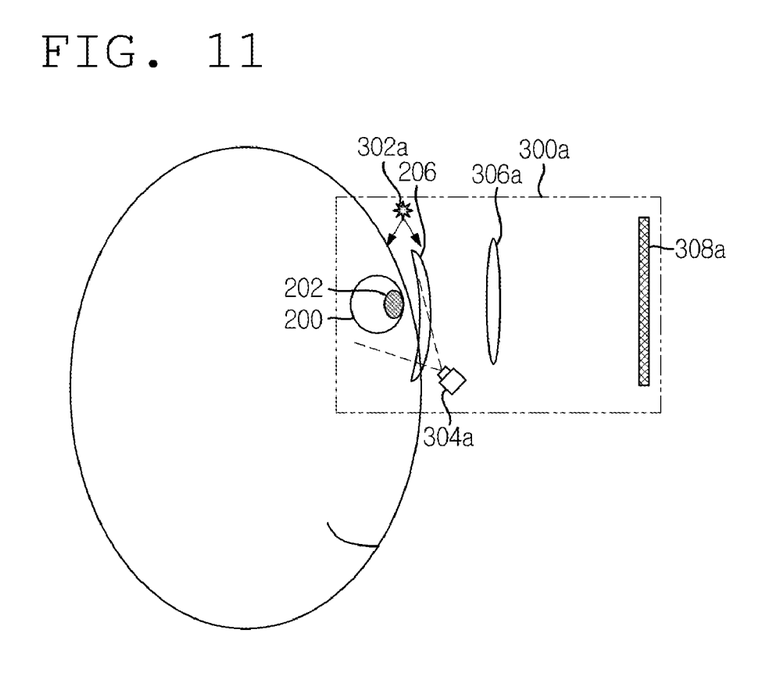
FIG. 11 is a view illustrating a case in which a user wearing glasses uses a gaze tracking device according to an embodiment of the present disclosure.
Figure 12:
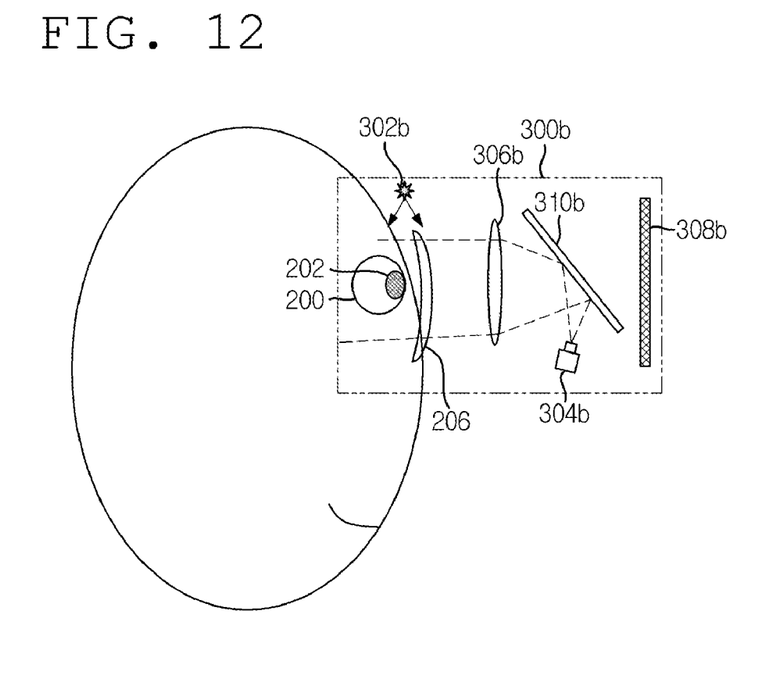
FIG. 12 is a view illustrating a case in which a user wearing glasses uses a gaze tracking device according to a modified embodiment of the present disclosure.

FIG. 11 is a view illustrating a case in which a user wearing glasses uses a gaze tracking device according to an embodiment of the present disclosure. FIG. 12 is a view illustrating a case in which a user wearing glasses uses a gaze tracking device according to a modified embodiment of the present disclosure.

As wearable devices like HMD, first and second gaze tracking devices 300A and 300B according to the embodiments illustrated in FIG. 11 and FIG. 12 execute the above-described function by including every configuration in FIG. 3 and are additionally equipped with a configuration described below.

Substantially the same as FIG. 9, the first gaze tracking device 300A according to the present embodiment illustrated in FIG. 11 employs a method in which a camera 304A, that is, an image acquisition unit directly captures an eyeball 200 in a direction toward the eyeball 200.

The first gaze tracking device 300A includes the camera 304A, which is placed between the eyeball 200 and a lens 306A, and a display unit 308A. A light source 302A may be set by at least one of a position, an illuminance, and an irradiation angle so that an actual corneal reflection light, which is reflected from cornea and is detected, occurs in an eyeball image 114 as seldom as possible. When a user wears glasses 206, at least one of a position, an illuminance and an irradiation angle of the light source 302A may be set so that no glasses reflection occurs in the eyeball image 114.

As the first gaze tracking device 300A according to the present embodiment does not require an actual corneal reflection light, the light source 302A emitting infrared light may irradiate the surrounding of an eyeball at an illuminance enough to capture a pupil 202.

Specifically, as it is not necessary to detect an actual corneal reflection light, the light source 302A may be set to so a low illuminance as to detect only the pupil 202. Accordingly, as the degree of freedom of a position of the light source 302A increases, the light source 302A may be placed not only as in FIG. 9 and FIG. 10 but also at a position, in which light is not irradiated in a direction toward glasses when an irradiation angle and an illuminance are adjusted, for example, between the eyeball 200 and the glasses 206. When the light source 302A is set according to the above-described irradiation angle, illuminance and position, infrared light irradiated toward glasses is minimized so that no glasses reflection occurs. Accordingly, a center of the pupil 202 is detected more accurately, and the accuracy of gaze tracking is improved. That is, by using the light source 302A with an illuminance so low as to prevent not only glasses reflection but also an actual corneal reflection light, a gaze may be accurately detected based on a virtual corneal reflection light and a PCVR vector.

FIG. 11 illustrated that the light source 302A was located above the eyeball 200. However, when no glasses reflection is caused, any position around the eyeball 200 is possible.

Substantially the same as FIG. 10, the second gaze tracking device 300B according to a modification of the present embodiment illustrated in FIG. 12 employs a configuration method in which a camera 304B, that is, an image acquisition unit indirectly captures the eyeball 200 that is reflected and emitted from a reflection unit 310B installed toward the eyeball 200.

The second gaze tracking device 300B includes the camera 304B, which is placed between a lens 306B facing the eyeball 200 of a user and the reflection unit 310B, the light source 302B located around the glasses 206 so that no glasses reflection occurs, and the display unit 308B.

The reflection unit 310B may be configured as a hot mirror that passes wavelengths of visible lights but reflects infrared wavelengths. A user may view an image of the display unit 308B emitting visible lights, and the camera 304B may take an image of the eyeball 200 using an infrared light.

The light source 302A may be set by at least one of a position, an illuminance, and an irradiation angle so that an actual corneal reflection light, which is reflected from cornea and is detected, occurs in an eyeball image 114 as seldom as possible. When a user wears glasses 206, at least one of a position, an illuminance and an irradiation angle of the light source 302B may be set so that no glasses reflection occurs in the eyeball image 114. Thus, the effect described in FIG. 11 may be produced.

FIG. 12 illustrated that the light source 302B was located above the eyeball 200. However, when no glasses reflection is caused, any position around the eyeball 200 is possible.

Meanwhile, in the embodiments of FIG. 11 and FIG. 12, the description focused on the block-out type gaze tracking devices 300A and 300B, which visually blocks an actual environment out and enables only an image provided by a display unit to be viewed, but the embodiment according to FIG. 3 may be applied to a see-through type gaze tracking device, which enables both an actual environment and an image to be viewed, as long as a technical configuration is allowed.

A see-through gaze tracking device may be used to display an augmented reality image through a see-through display. Herein, a displayed virtual object may be seen with a physical object in an actual background scene. A see-through display may be configured to display images of both sides to a user and to enable the user to see an actual environment. For example, each see-through display may include a display device that is configured to emit a display light to a user's eye through an optical configuration. In addition, an optical configuration may enable a light from an actual environment to reach a user's eye. A configuration and a function according to the embodiments described in FIG. 3, FIG. 7 and FIG. 8 may be implemented not only to perform calibration on a see-through display but also to predict a user's gazing point.

According to the present disclosure, a gaze tracking device and a method using the same may be provided which may track a gaze of a user even when an actual corneal reflection light is not detected in the gaze tracking device.

According to the present disclosure, a gaze tracking device and a method using the same may be provided which increases a degree of freedom at a light source position by not requiring detection of an actual corneal reflection light and prevents unnecessary light reflected from glasses by locating a light source closer to an eyeball thereby easily tracking a gaze of a glasses wearer.

Effects obtained in the present disclosure are not limited to the above-mentioned effects, and other effects not mentioned above may be clearly understood by those skilled in the art from the following description.

While the exemplary methods of the present disclosure described above are represented as a series of operations for clarity of description, it is not intended to limit the order in which the steps are performed, and the steps maybe performed simultaneously or indifferent order as necessary. In order to implement the method according to the present disclosure, the described steps may further include other steps, may include remaining steps except for some of the steps, or may include other additional steps except for some of the steps.

The various embodiments of the present disclosure are not a list of all possible combinations and are intended to describe representative aspects of the present disclosure, and the matters described in the various embodiments may be applied independently or in combination of two or more.

In addition, various embodiments of the present disclosure may be implemented in hardware, firmware, software, or a combination thereof. In the case of implementing the present disclosures by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

What is claimed is:

1. A gaze tracking apparatus, the apparatus comprising:
an image acquisition unit configured to obtain an eyeball image;
a pupil detection unit configured to detect a center of pupil by using the eyeball image;
a virtual corneal reflection light position generator configured to process the eyeball image so that a virtual corneal reflection light is located at a predetermined point in the eyeball image; and
a PCVR vector generator configured to generate a pupil center virtual reflection vector (PCVR vector) based on a position of the pupil center and a position of the virtual corneal reflection light.

2. The gaze tracking apparatus of claim 1,
wherein the position of the virtual corneal reflection light is maintained to be consistent with a predetermined region.

3. The gaze tracking apparatus of claim 1,
wherein the PCVR vector generator generates the PCVR vector by excluding a position of an actual corneal reflection light that is reflected and detected on cornea due to light irradiation in the eyeball image.

4. The gaze tracking apparatus of claim 1, further comprising a calibration unit configured
to provide a plurality of gaze induction markers sequentially to a display unit,
to obtain PCVR vectors that are generated from the PCVR vector generator based on each position of pupil centers detected from the pupil detection unit at each gaze induction marker in the eyeball image and a position of the virtual corneal reflection light, and
to calculate a mapping function for estimating a gazing point based on the PCVR vectors.

5. The gaze tracking apparatus of claim 1, further comprising a gazing point prediction unit configured
to predict a gazing point on a display unit based on the PCVR vector and a mapping function for estimating the gazing point by obtaining the PCVR vector that is generated from the PCVR vector generator based on the position of the pupil center detected from the pupil detection unit in the eyeball image and the position of the virtual corneal reflection light.

6. The gaze tracking apparatus of claim 5,
wherein the virtual corneal reflection light, which is used when generating the PCVR vector and when predicting the gazing point, is maintained at a same position in the eyeball image.

7. The gaze tracking apparatus of claim 1, further comprising a light source for irradiating light to the eyeball,
wherein the light source is set by at least one of a position, an illuminance, and an irradiation angle so that no actual corneal reflection light, which is reflected from cornea and is detected, occurs in the eyeball image.

8. The gaze tracking apparatus of claim 7,
wherein, when a user wears glasses, the light source is set by at least one of the position, the illuminance and the irradiation angle of the light source so that no glasses reflection occurs in the eyeball image.

9. The gaze tracking apparatus of claim 1,
wherein the image acquisition unit is configured either to directly capture the eyeball in a capturing direction toward the eyeball or to indirectly capture the eyeball that is reflected and emitted from a reflection unit installed toward the eyeball.

10. The gaze tracking apparatus of claim 1,
wherein the gaze tracking apparatus is configured either as a block-out type gaze tracking device that visually blocks an actual environment out and enables only an image provided by a display unit to be viewed, or as a see-through type gaze tracking device that enables both an actual environment and the image to be viewed.

11. A gaze tracking method, the method comprising:
obtaining an eyeball image;
detecting a center of pupil by using the eyeball image; and
generating a pupil center virtual reflection vector (PCVR vector) based on a position of the pupil center and a position of a virtual corneal reflection light that is processed to appear at a predetermined point in the eyeball image.

12. The gaze tracking method of claim 11,
wherein the position of the virtual corneal reflection light is maintained to be consistent with a predetermined region.

13. The gaze tracking method of claim 11,
wherein the generating of the PCVR vector generates the PCVR vector by excluding a position of an actual corneal reflection light that is reflected and detected on cornea due to light irradiation in the eyeball image.

14. The gaze tracking method of claim 11, further comprising:
    before the generating of the PCVR vector, processing the eyeball image so that the virtual corneal reflection light is located at a predetermined point in the eyeball image; and
    after the generating of the PCVR vector, providing a plurality of gaze induction markers sequentially to a display unit, obtaining PCVR vectors based on each position of pupil centers detected at each gaze induction marker in the eyeball image and a position of the virtual corneal reflection light, and to calculating a mapping function for estimating a gazing point based on the PCVR vectors.

15. The gaze tracking method of claim 11, further comprising
    after the generating of the PCVR vector, predicting the gazing point on a display based on the PCVR vector and a mapping function for estimating the gazing point by obtaining the PCVR vector based on the position of the pupil center detected in the eyeball image and the position of the virtual corneal reflection light.

16. The gaze tracking method of claim 15,
    wherein the virtual corneal reflection light, from the generating of the PCVR vector to the predicting of the gazing point, is maintained at a same position in the eyeball image.

17. The gaze tracking method of claim 11,
    wherein the obtaining the eyeball image comprises obtaining the eyeball image by irradiating light to the eyeball by a light source, and
    wherein the light source is set by at least one of a position, an illuminance, and an irradiation angle so that no actual corneal reflection light, which is reflected from cornea and is detected, occurs in the eyeball image.

18. The gaze tracking method of claim 17,
    wherein, when a user wears glasses, the light source is set by at least one of the position, the illuminance and the irradiation angle of the light source so that no glasses reflection occurs in the eyeball image.

19. The gaze tracking method of claim 11,
    wherein the obtaining of the eyeball image comprises either directly capturing the eyeball in a capturing direction toward the eyeball or indirectly capturing the eyeball that is reflected and emitted from a reflection unit installed toward the eyeball.

20. The gaze tracking method of claim 11,
wherein a gaze tracking apparatus configured to implement the gaze tracking method is a block-out type gaze tracking device, which visually blocks an actual environment out and enables only an image provided by a display unit to be viewed, or a see-through type gaze tracking device that enables both an actual environment and the image to be viewed.

* * * * *